3,288,571
PREPARATION OF URANIUM ALUMINIDES
UAl₃ AND UAl₄.₅

William J. Werner, Clinton, Tenn., Melvin C. McIlwain, Huntsville, Ala., and Joseph P. Hammond, Knoxville, Tenn., assignors to the United States of America as represented by the United States Atomic Energy Commission
No Drawing. Filed Oct. 14, 1965, Ser. No. 496,195
5 Claims. (Cl. 23—347)

The invention described herein was made in the course of, or under a contract with the U.S. Atomic Energy Commission.

The present invention relates to nuclear fuel compositions containing uranium and aluminum. More particularly, it relates to methods for preparing aluminides of the class $UAl_3$ and $UAl_{4.5}$ in a relatively pure form.

Aluminum and alloys thereof have become standard materials of fabrication for nuclear fuel elements. As the nuclear reactor art has progressed, the maximum desired heat flux and power density in power producing reactors have increased significantly. These increases have presented difficult metallurgical problems, particularly as they relate to the use of uranium as uranium-aluminum alloys in reactors designed for increased heat flux, thermal power density, and fuel temperature service. Thus, for example, uranium-aluminum alloys are useful in reactors up to about 25 weight percent uranium. Above this limit, macro-segregation of the uranium becomes a problem and the fuel is hard to fabricate. Moreover, it becomes difficult to incorporate burnable poisons, such as boron, to these alloys in controlled amounts and with uniform distribution.

It has been proposed to overcome these problems by using a cermet core of a uranium oxide, such as $U_3O_8$ or $UO_2$, dispersed in aluminum to which controlled amounts of a burnable poison, e.g. $B_4C$, can be added, said mixture being clad with aluminum. Recent experiments have shown, however, that uranium oxides and aluminum undergo adverse Thermit-type reactions under reactor conditions causing the fuel core and cladding to blister and rupture. On the other hand, it has been shown that fuel cores containing uranium intermetallic aluminides such as $UAl_3$ and $UAl_4$ undergo much less pronounced changes than cores containing the oxides, under the same conditions. This increased stability is attributed to the better conductivity of the intermetallic as well as to the fact that no adverse reactions can take place between these materials and the aluminum matrix or cladding. It is to be noted that the thermal conductivity of $UAl_3$ or $UAl_4$ is nearly an order of magnitude higher than that of $UO_2$ under design reactor temperature service conditions.

It is accordingly a principal object of this invention to take advantage of the useful qualities of $UAl_3$ and $UAl_{4.5}$ as reactor fuels by providing a method of synthesizing these materials in a pure form, preferably as a powder.

The standard method of preparing uranium aluminides is by in situ- or drop-casting a mass of molten uranium-aluminum alloy prepared by arc melting. The production of aluminides by the casting melting technique presents problems. Under the most careful control, the castings invariably consist of a mixture of products including $UAl_2$, $UAl_3$, and $UAl_{4.5}$ together with some unreacted aluminum and adversely high contamination of carbon when a graphite crucible is used. Such a multiphase product is undesirable for several reasons. First, the uranium-rich phases will be thermodynamically unstable during use of the fuel. As a result of its multiphase state, rendition by grinding and sieving to a powder of closely controlled particle size is hampered. Because the powder can vary in composition from particle to particle, segregation of uranium in the fabricated fuel element can result. Finally, this method requires a considerable capital expense for equipment. These foregoing difficulties are avoided or ameliorated by our invention which utilizes powder metallurgy techniques to fabricate the desired uranium aluminide.

In accordance with this invention, aluminum and uranium powder are mixed in the required stoichiometric proportions and then heated to an appropriate temperature as dictated by the phase diagram of the uranium-aluminum system to allow ample interdiffusion of the elements without melting the desired compound.

Although our discovery is based on the use of powder as the starting materials for forming the aluminide, the particular steps in making $UAl_3$ as opposed to $UAl_{4.5}$ are surprisingly different. For example, to make $UAl_{4.5}$ it is only necessary to mix stoichiometric quantities of aluminum and uranium or uranium hydride powder and heat the loose powder mixture for a period of time generally from 2 to 4 hours, depending on the temperature, in vacuum or under an inert gas blanket at a temperature below 730° C. and preferably at a temperature in the range 715° C.–725° C. for a period of time sufficient to allow reaction by diffusion. The resulting product is a loosely compacted spongy mass which can be easily ground to a high surface to volume powder with an excellent sinterability quality. Quantitative conversion of the powder reactants by this method which results in a substantially pure uranium aluminide product has been confirmed by chemical as well as by X-ray analyses.

On the other hand, if a loose powder mixture of uranium or uranium hydride and aluminum in the stoichiometric proportions equivalent to $UAl_3$ is heated to a comparable temperature or to a temperature somewhat below the melting point of $UAl_3$, it is found that an aluminum-rich melt forms and tends to segregate so that the resulting product consists of an incompletely reacted mass containing mixtures of several uranium aluminides. In order to make a clean, essentially pure $UAl_3$ product, it is necessary, in accordance with this invention, to hot press powder reactants above the melting point of aluminum and below the peritectic point for $UAl_3$.

Aside from these differences, the synthesis of $UAl_3$ and $UAl_{4.5}$ by powder metallurgical techniques proceeds efficiently to a quantitative yield of the desired aluminide. Since the reaction in both cases is considered to be diffusion controlled, it is preferred that the particle size of the powder reactants be as fine as possible. For this purpose, aluminum powders of high purity having an average particle size of less than about 50 microns is suitable and such powders are generally available commercially. While elemental uranium powder is also available in this fine size, it is generally preferred to employ uranium hydride as the source material because it is available in a purer form and decomposes readily during synthesis of the aluminide to a very fine powder of high reactivity.

The following examples will illustrate the invention with somewhat greater particularity.

*Example I*

This example illustrates the preparation of $UAl_3$.

A mixture of uranium hydride (−325 mesh) and a 2–3 weight percent stoichiometric excess of high purity of aluminum powder (−325 mesh) was mixed and blended under an inert blanket of argon. The slight excess of aluminum was used to account for vaporization losses during subsequent heating. The mixture was then placed in a graphite die enclosed by a chamber to allow the sample to be enclosed in vacuum or an inert atmosphere and the die was heated to about 450° C. in 1 hour while exhausting the atmosphere in the die chamber of hydrogen resulting from the decomposition of the uranium hydride. After the uranium hydride had been completely decomposed, a backfill of argon gas was then supplied to the die chamber while heating the die to 600° C. within a period of 1 hour. At this point, a pressure of 1000 p.s.i. was applied and the die was heated to 800° C. Temperature at pressure was maintained for 30 minutes to enhance reaction by diffusion. The die was then heated to 1000° C. in the space of 1 hour and held at temperature for an additional hour to insure complete reaction of the starting ingredients. The hot pressed compact was then cooled to room temperature, removed from the die, and crushed to powder. Chemical analysis of this powder showed the composition to consist of essentially pure $UAl_3$. Chemical identification was confirmed by X-ray analysis. The impurity content of the $UAl_3$ powder comprised carbon 50 parts/million, oxygen 130 parts/million, and nitrogen 41 parts/million. This is to be contrasted with the melt-casting technique for forming $UAl_3$ in a graphite crucible wherein the product generally consists of a mixture of aluminides and a carbon content which may run in excess of 3000 parts/million. Despite the fact that most of the processing cycle was conducted above the melting temperature of aluminum, there was no evidence of the formation of a liquid phase.

In the example just described, a pressure of 1000 p.s.i. was used during the hot pressing. However, operable pressure ranges may range from as low as 500 to as much as 4000 p.s.i. while still producing an essentially pure $UAl_3$ product. However, at the higher pressures, i.e., in excess of 1500 p.s.i., the resulting compact is more difficult to reduce to powder and the sinterability of the resulting powder is somewhat less than the powder produced at the lower pressures.

*Example II*

$UAl_{4.5}$ was synthesized by sintering loose elemental powder consisting of −325 mesh uranium and −325 mesh aluminum for two hours at 715° C.–725° C. A 15% excess aluminum was used in the initial mixture to compensate for loss of vaporized aluminum. The product was a brittle, porous, low density mass which was shown to be essentially pure $UAl_{4.5}$ by chemical and X-ray diffraction analyses. The chemical analyses showed the product to contain 64.7 weight percent uranium and 35.3 weight percent aluminum. The impurity content conformed closely to the impurity content of the starting powders used.

The uranium-aluminide powders produced by this invention are sufficiently sinterable so that useful densified compacts can be fabricated, for example, by blending with aluminum powder and boron or $B_4C$ to form useful nuclear fuel elements in which the chemical form as well as the concentration and distribution of the uranium can be controlled. The uranium-aluminide powders are somewhat pyrophoric but can, nevertheless, be treated by standard powder metallurgical techniques to form densified compacts. Such compacts may consist of the aluminide in an aluminum matrix with an aluminum or other metal clad. A homogeneous distribution of burnable poison is desirable in certain fuels and this may easily be achieved by including such poison in the original uranium aluminide-aluminum powder mixture.

Having thus described our invention, we claim:

1. A method of forming a sinterable powder aluminide of uranium selected from $UAl_3$ and $UAl_{4.5}$ which comprises heating a mixture of aluminum and uranium or uranium hydride powder to a temperature below the melting point of the desired compound for a period of time sufficient to allow interdiffusion of the said reactants.

2. A method of forming $UAl_3$ which comprises hot-pressing a powdered mixture of aluminum with uranium or uranium hydride to a temperature below the melting point of $UAl_3$ for a period of time sufficient to allow interdiffusion of uranium and aluminum atoms.

3. The method according to claim 2 in which the powdered mixture is pressed at a pressure in the range 500–1500 p.s.i.

4. A method of forming a sinterable powder containing $UAl_{4.5}$ which comprises heating a mixture of aluminum powder and uranium or uranium hydride powder in at least the stoichiometric proportions required for the desired compound to a temperature above 640° C. but below 730° C. for a period of time sufficient to allow interdiffusion of uranium and aluminum atoms and thereafter comminuting the reaction product to powder.

5. The method according to claim 1 in which the reactants are mixed in at least stoichiometric proportions.

References Cited by the Examiner

UNITED STATES PATENTS 3,150,975   9/1964   Beaver et al. _____ 75—214

OTHER REFERENCES

Reactor Core Materials, February 1960, vol. 3, No. 1, pages 14–15.

Reactor Core Materials, February 1961, vol. 4, No. 1, page 52.

References Cited by the Applicant

TID–11295 (3rd edition), Nuclear Fuels and Materials Development, pp. II.105–II.113.

BENJAMIN R. PADGETT, *Primary Examiner.*

M. J. SCOLNICK, *Assistant Examiner.*